(12) United States Patent
Conley et al.

(10) Patent No.: US 6,887,542 B2
(45) Date of Patent: May 3, 2005

(54) METHOD FOR TREATING AN ELASTOMERIC ARTICLE

(75) Inventors: William E. Conley, Alpharetta, GA (US); David W. Johnson, Alpharetta, GA (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 149 days.

(21) Appl. No.: 10/317,139

(22) Filed: Dec. 11, 2002

(65) Prior Publication Data

US 2004/0115379 A1 Jun. 17, 2004

(51) Int. Cl.[7] ................................. B05D 1/18
(52) U.S. Cl. ............... 428/35.7; 427/233; 427/236; 427/242; 427/424
(58) Field of Search ............... 428/35.7; 427/233, 427/236, 242, 424

(56) References Cited

U.S. PATENT DOCUMENTS

| | | |
|---|---|---|
| 3,338,992 A | 8/1967 | Kinney |
| 3,341,394 A | 9/1967 | Kinney |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 4,041,203 A | 8/1977 | Brock et al. |
| 4,310,928 A | 1/1982 | Joung |
| 4,340,563 A | 7/1982 | Appel et al. |
| 4,374,888 A | 2/1983 | Bornslaeger |
| 4,548,844 A | 10/1985 | Podell et al. |
| 5,069,965 A | 12/1991 | Esemplare |
| 5,145,727 A | 9/1992 | Potts et al. |
| 5,169,706 A | 12/1992 | Collier, IV et al. |
| 5,178,931 A | 1/1993 | Perkins et al. |
| 5,188,885 A | 2/1993 | Timmons et al. |
| 5,391,343 A | 2/1995 | Dreibelbis et al. |
| 5,500,469 A | 3/1996 | Johnsen et al. |
| 5,612,083 A * | 3/1997 | Haung et al. ............... 264/233 |
| 5,993,923 A | 11/1999 | Lee |
| 5,993,972 A | 11/1999 | Reich et al. |
| 6,000,061 A | 12/1999 | Taneja et al. |
| 6,019,922 A | 2/2000 | Hassan et al. |
| 6,204,358 B1 | 3/2001 | Tanaka et al. |
| 6,239,253 B1 | 5/2001 | Tanaka et al. |
| 6,284,856 B1 | 9/2001 | Lee |
| 6,335,407 B1 | 1/2002 | Tanaka et al. |

FOREIGN PATENT DOCUMENTS

| | | |
|---|---|---|
| EP | 0105613 A1 * | 4/1984 |
| EP | 0332270 A2 * | 9/1989 |
| EP | 0 360 805 B1 | 4/1993 |
| EP | 0 686 004 B1 | 3/1999 |
| EP | 0 906 731 A2 | 4/1999 |
| EP | 0 921 133 A1 | 6/1999 |
| WO | WO 94/02676 | 2/1994 |
| WO | WO 00/47070 | 8/2000 |
| WO | WO 01/30186 | 5/2001 |

* cited by examiner

Primary Examiner—Sandra M. Nolan
(74) Attorney, Agent, or Firm—Nathan P. Hendon; Dana E. Stano

(57) ABSTRACT

A method of treating a surface of an elastomeric article is provided. The method includes providing a substrate having a treatment, providing an elastomeric article with an exposed surface, placing the article and the substrate into a tumbling apparatus, and tumbling the article with the substrate so that the treatment is transferred from the substrate to the exposed surface.

20 Claims, 1 Drawing Sheet

METHOD FOR TREATING AN ELASTOMERIC ARTICLE

BACKGROUND

Tightly fitting elastomeric articles, such as surgical and examination gloves, may be difficult to dispense or don due to "bricking", the tendency of the exterior surface, or gripping surface, of the glove to stick to itself. As a result, various techniques have been employed to reduce glove bricking. One such technique includes halogenation, for example chlorination, of the gripping surface to reduce the tackiness of the glove. While effective, chlorination of gloves is costly because it requires a large quantity of water, chlorine-safe equipment, and costly drying heat.

At the same time, it may be advantageous lubricate the interior surface of the glove to further enhance donning, comfort, and so forth. Application of a lubricant using traditional immersion techniques often results in inadvertent treatment of the gripping surface, thereby potentially compromising the wearer's ability to securely grasp objects.

As such, a need exists for a simplified, cost-effective technique for modifying the surface characteristics of a glove. In addition, a need exists to be able to treat one surface of an article without inadvertently treating another.

SUMMARY OF THE INVENTION

The present invention generally relates to a method of modifying the surface characteristics of an elastomeric article, for example, a glove or a condom. The method is substantially water-free, and includes providing a substrate having a treatment, providing an elastomeric article having an exposed surface, placing the article and the substrate into a tumbling apparatus, and tumbling the article with the substrate such that the treatment is transferred from the substrate to the exposed surface. The apparatus may be heated, and in some embodiments, may be heated to a temperature of from about 20° C. to about 80° C. Any treatment may be used, and in some embodiments, the treatment is a surfactant.

The present invention further includes a method of selectively applying a treatment to an elastomeric article. The method includes tumbling a first substrate impregnated with a first treatment with at least one elastomeric article having an interior surface and an exterior surface, where the exterior surface is exposed, so that the first treatment is transferred from the first substrate to the exterior surface. The article is then inverted to expose the interior surface, and tumbled with a second substrate impregnated with a second treatment so that the second treatment is transferred from the substrate to the interior surface. In some embodiments, the first treatment may be a cationic surfactant, for example, behenetrimonium methosulfate, distearyldimonium chloride, or dimethyl dioctadecyl ammonium chloride. In some embodiments, the second treatment may be a lubricant, for example, a silicone. One or more tumbling apparatuses may be used to apply multiple treatments to the article.

The present invention finally relates to an elastomeric glove having reduced tack formed by a method including providing a substrate having a treatment including a cationic surfactant, providing a glove having an exterior surface and an interior surface, where the exterior surface is anionic, placing the glove and the substrate into a tumbling apparatus, and tumbling the glove with the substrate so that the treatment is transferred from the substrate to the exterior surface.

DESCRIPTION

Figure 1:
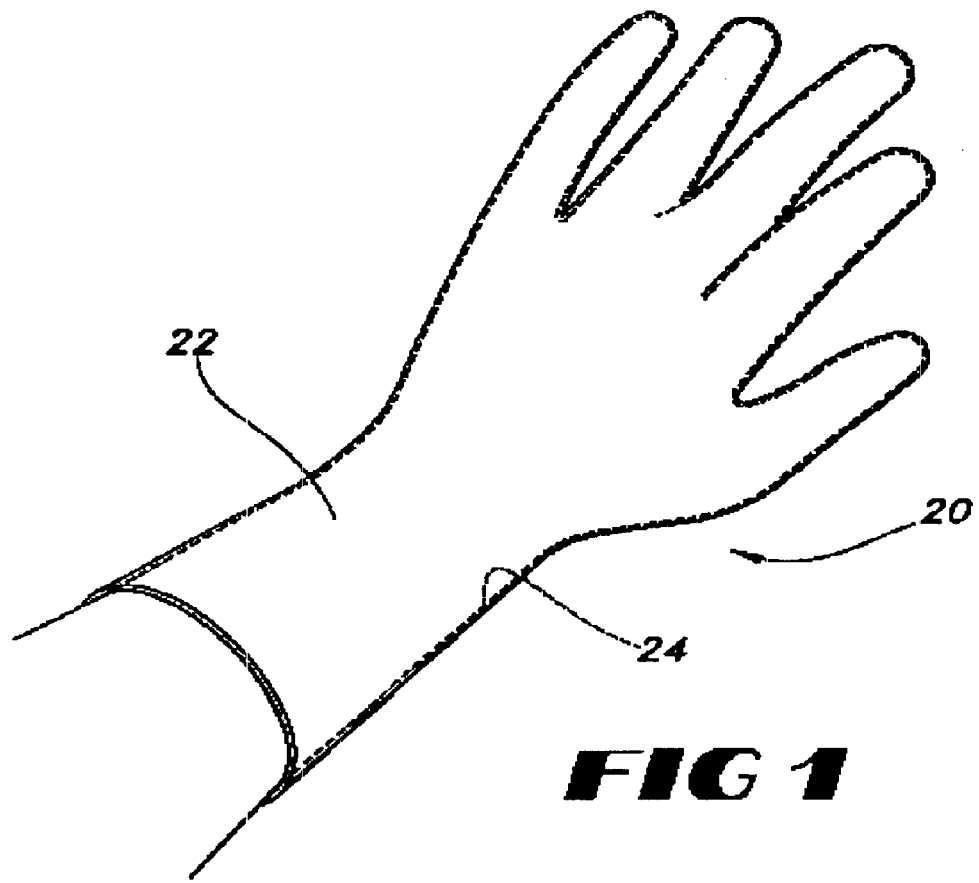
FIG. 1 depicts an elastomeric article, namely a glove, that may be used with the present invention.

The present invention generally relates to a method of modifying the surface characteristics of an elastomeric article, for example, a glove for use in medical and/or scientific applications, or a condom. As used herein, the term "elastomeric article" refers to an article having at least one surface formed predominantly from an elastomeric material. As used herein, the term "elastomeric material" refers to a polymeric material that is capable of being easily stretched or expanded, and will substantially return to its previous shape upon release of the stretching or expanding force. Specifically, the technique contemplated by the present invention enables the article to be treated on one surface and not the other, or to be treated on both surfaces with different treatments. As used herein, the term "treatment" refers to any chemical agent that may be applied to the surface of an article that imparts some functionality thereto. Examples of treatments include, but are not limited to, colorants, surfactants, antimicrobial agents, repellents, lubricants, antistatic agents, friction enhancers, and so forth.

To apply a treatment to a single article or a plurality of articles, a substrate is first coated with the treatment. The article and the treated substrate are then subjected to a tumbling process, during which repeated contact between the coated substrate and the article causes the treatment to be transferred from the substrate to the article. This process may be used to apply various treatments to the article, and may be used to apply different treatments to various surfaces of the article. To better understand the present invention, the entirety of the process is described below.

An elastomeric article to be treated, for example, a glove, may be formed using a variety of processes, for example, dipping, spraying, tumbling, drying, and curing. An exemplary dipping process for forming a glove is described herein, though other processes may be employed to form various articles having different shapes and characteristics. For example, a condom may be formed in substantially the same manner, although some process conditions may differ from those used to form a glove. Although a batch process is described and shown herein, it should be understood that semi-batch and continuous processes may also be utilized with the present invention.

A glove 20 (FIG. 1) is formed on a hand-shaped mold, termed a "former". The former may be made from any suitable material, such as glass, metal, porcelain, or the like. The surface of the former defines at least a portion of the surface of the glove 20 to be manufactured. The glove 20 includes an exterior surface 22 and an interior surface 24.

The former is conveyed through a preheated oven to evaporate any water present. The former is then dipped into a bath typically containing a coagulant, a powder source, a surfactant, and water. The coagulant may contain calcium ions (e.g., calcium nitrate) that enable a polymer latex to deposit onto the former. The powder may be calcium carbonate powder, which aids release of the completed glove from the former. The surfactant provides enhanced wetting to avoid forming a meniscus and trapping air between the form and deposited latex, particularly in the cuff area. However, any suitable coagulant composition may be used, including those described in U.S. Pat. No. 4,310,928 to Joung, incorporated herein in its entirety by reference. The residual heat evaporates the water in the coagulant mixture leaving, for example, calcium nitrate, calcium carbonate powder, and the surfactant on the surface of the former.

The coated former is then dipped into a polymer bath. The polymer present in the bath includes an elastomeric material that forms the glove 20. In some embodiments, the elastomeric material, or elastomer, includes natural rubber, which may be supplied as a compounded natural rubber latex.

Thus, the bath may contain, for example, compounded natural rubber latex, stabilizers, antioxidants, curing activators, organic accelerators, vulcanizers, and the like. In other embodiments, the elastomeric material may be nitrile butadiene rubber, and in particular, carboxylated nitrile butadiene rubber. In other embodiments, the elastomeric material may be a styrene-ethylene-butylene-styrene block copolymer, styrene-isoprene-styrene block copolymer, styrene-butadiene-styrene block copolymer, styrene-isoprene block copolymer, styrene-butadiene block copolymer, synthetic isoprene, chloroprene rubber, polyvinyl chloride, silicone rubber, or a combination thereof.

The stabilizers may include phosphate-type surfactants. The antioxidants may be phenolic, for example, 2,2'-methylenebis (4-methyl-6-t-butylphenol). The curing activator may be zinc oxide. The organic accelerator may be dithiocarbamate. The vulcanizer may be sulfur or a sulfur-containing compound. To avoid crumb formation, the stabilizer, antioxidant, activator, accelerator, and vulcanizer may first be dispersed into water by using a ball mill and then combined with the polymer latex.

During the dipping process, the coagulant on the former causes some of the elastomer to become locally unstable and coagulate onto the surface of the former. The elastomer coalesces, capturing the particles present in the coagulant composition at the surface of the coagulating elastomer. The former is withdrawn from the bath and the coagulated layer is permitted to fully coalesce, thereby forming the glove. The former is dipped into one or more baths a sufficient number of times to attain the desired glove thickness. In some embodiments, the glove may have a thickness of from about 0.004 inches (0.102 mm) to about 0.012 inches (0.305 mm).

Where the elastomer is natural rubber, the former is then dipped into a leaching tank in which hot water is circulated to remove the water-soluble components, such as residual calcium nitrates and proteins contained in the natural rubber latex. This leaching process may generally continue for about twelve minutes at a water temperature of about 120° F. The glove is then dried on the former to solidify and stabilize the glove. It should be understood that various conditions, process, and materials used to form the glove. Other layers may be formed by including additional dipping processes. Such layers may be used to incorporate additional features into the glove.

The glove is then sent to a curing station where the elastomer is vulcanized, typically in an oven. The curing station initially evaporates any remaining water in the coating on the former and then proceeds to a higher temperature vulcanization. The drying may occur at a temperature of from about 85° C. to about 95° C., and the vulcanizing may occur at a temperature of from about 110° C. to about 120° C. For example, the glove may be vulcanized in a single oven at a temperature of 115° C. for about 20 minutes. Alternatively, the oven may be divided into four different zones with a former being conveyed through zones of increasing temperature. For instance, the oven may have four zones with the first two zones being dedicated to drying and the second two zones being primarily for vulcanizing. Each of the zones may have a slightly higher temperature, for example, the first zone at about 80° C., the second zone at about 95° C., a third zone at about 105° C., and a final zone at about 115° C. The residence time of the former within each zone may be about ten minutes. The accelerator and vulcanizer contained in the latex coating of the former are used to crosslink the natural rubber. The vulcanizer forms sulfur bridges between different rubber segments and the accelerator is used to promote rapid sulfur bridge formation.

Upon being cured, the former may be transferred to a stripping station where the glove is removed from the former. The stripping station may involve automatic or manual removal of the glove from the former. For example, in one embodiment, the glove is manually removed and turned inside out as it is stripped from the former. By inverting the glove in this manner, the exterior of the glove on the former becomes the inside surface of the glove.

The solidified glove may then subjected to various post-formation processes, including application of one or more treatments to at least one side of the glove. In general, the method of the present invention is substantially water-free, providing significant advantages over traditional water-based processes, which are costly and more cumbersome.

After the stripping process discussed above, the exterior surface 22 of the elastomeric article, for example, the glove 20, is exposed, while the interior surface 24 is concealed. Any treatment, or combination of treatments, may be applied to the exterior surface of the glove. In some embodiments, a treatment that reduces glove bricking may be applied. One treatment that may be suitable for such a purpose is a surfactant. Various surfactants may be applied to the exterior surface, including those characterized as cationic, nonionic, anionic, amphoteric, and so forth.

Where the surface of the glove is anionic, such as in the case of a natural rubber glove or a nitrile glove, it may be advantageous to select one or more cationic surfactants. It is believed that this may, in some instances, improve transfer of the treatment to the glove. Cationic surfactants that may be used include, for example, behenetrimonium methosulfate, distearyldimonium chloride, dimethyl dioctadecyl ammonium chloride, cetylpyridinium chloride, methylbenzethonium chloride, hexadecylpyridinium chloride, hexadecyltrimethylammonium chloride, benzalkonium chloride, dodecylpyridinium chloride, the corresponding bromides, hydroxyethylheptadecylimdazolium halides, coco aminopropyl betaine, and coconut alkyldimethylammonium betaine. Additional cationic surfactants that may be used include methyl bis(hydrogenated tallow amidoethyl)-2-hydroxyethly ammonium methyl sulfate, methyl bis(tallowamido ethyl)-2-hydroxyethyl ammonium methyl sulfate, methyl bis(soya amidoethyl)-2-hydroxyethyl ammonium methyl sulfate, methyl bis(canola amidoethyl)-2-hydroxyethyl ammonium methyl sulfate, methyl bis(tallowamido ethyl)-2-tallow imidazolinium methyl sulfate, methyl bis(hydrogenated tallowamido ethyl)-2-hydrogenated tallow imidazolinium methyl sulfate, methyl bis(ethyl tallowate)-2-hydroxyethyl ammonium methyl sulfate, methyl bis(ethyl tallowate)-2-hydroxyethyl ammonium methyl sulfate, dihydrogenated tallow dimethyl ammonium chloride, didecyl dimethyl ammonium chloride, dioctyl dimethyl ammonium chloride, octyl decyl dimethyl ammonium chloride diamidoamine ethoxylates, diamidoamine imidazolines, and quaternary ester salts.

In some embodiments, one or more nonionic surfactants may be used. Nonionic surfactants typically have a hydrophobic base, such as a long chain alkyl group or an alkylated aryl group, and a hydrophilic chain comprising a certain number (e.g., 1 to about 30) of ethoxy and/or propoxy moieties. Examples of some classes of nonionic surfactants that may be used include, but are not limited to, ethoxylated alkylphenols, ethoxylated and propoxylated fatty alcohols, polyethylene glycol ethers of methyl glucose, polyethylene glycol ethers of sorbitol, ethylene oxide-propylene oxide block copolymers, ethoxylated esters of fatty ($C_8$–$C_{18}$) acids, condensation products of ethylene oxide with long chain amines or amides, condensation products of ethylene oxide with alcohols, and mixtures thereof.

Specific examples of suitable nonionic surfactants include, but are not limited to, methyl gluceth-10, PEG-20 methyl glucose distearate, PEG-20 methyl glucose sesquistearate, $C_{11-15}$ pareth-20, ceteth-8, ceteth-12, dodoxynol-12, laureth-15, PEG-20 castor oil, polysorbate 20, steareth-20, polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, an ethoxylated nonylphenol, ethoxylated octylphenol, ethoxylated dodecylphenol, or ethoxylated fatty ($C_6$–$C_{22}$) alcohol, including 3 to 20 ethylene oxide moieties, polyoxyethylene-20 isohexadecyl ether, polyoxyethylene-23 glycerol laurate, polyoxyethylene-20 glyceryl stearate, PPG-10 methyl glucose ether, PPG-20 methyl glucose ether, polyoxyethylene-20 sorbitan monoesters, polyoxyethylene-80 castor oil, polyoxyethylene-15 tridecyl ether, polyoxy-ethylene-6 tridecyl ether, laureth-2, laureth-3, laureth-4, PEG-3 castor oil, PEG 600 dioleate, PEG 400 dioleate, oxyethanol, 2,6,8-trimethyl-4-nonyloxypolyethylene oxyethanol; octyphenoxy polyethoxy ethanol, nonylphenoxy polyethoxy ethanol, 2,6,8-trimethyl-4-nonyloxypolyethylene alkyleneoxypolyethyleneoxyethanol, alkyleneoxypolyethyleneoxyethanol; alkyleneoxypolyethyleneoxyethanol, and mixtures thereof.

Additional nonionic surfactants that may be used include water soluble alcohol ethylene oxide condensates that are the condensation products of a secondary aliphatic alcohol containing between about 8 to about 18 carbon atoms in a straight or branched chain configuration condensed with between about 5 to about 30 moles of ethylene oxide. Such nonionic surfactants are commercially available under the trade name Tergitol® from Union Carbide Corp., Danbury, Conn. Specific examples of such commercially available nonionic surfactants of the foregoing type are $C_{11}$–$C_{15}$ secondary alkanols condensed with either 9 moles of ethylene oxide (Tergitol® 15-S-9) or 12 moles of ethylene oxide (Tergitol® 15-S-12) marketed by Union Carbide Corp., (Danbury, Conn.).

Other suitable nonionic surfactants include the polyethylene oxide condensates of one mole of alkyl phenol containing from about 8 to 18 carbon atoms in a straight- or branched chain alkyl group with about 5 to 30 moles of ethylene oxide. Specific examples of alkyl phenol ethoxylates include nonyl condensed with about 9.5 moles of ethylene oxide per mole of nonyl phenol, dinonyl phenol condensed with about 12 moles of ethylene oxide per mole of phenol, dinonyl phenol condensed with about 15 moles of ethylene oxide per mole of phenol and diisoctylphenol condensed with about 15 moles of ethylene oxide per mole of phenol. Commercially available nonionic surfactants of this type include Igepal® CO-630 (a nonyl phenol ethoxylate) marketed by ISP Corp. (Wayne, N.J.). Suitable non-ionic ethoxylated octyl and nonyl phenols include those having from about 7 to about 13 ethoxy units.

In some embodiments, one or more amphoteric surfactants may be used. One class of amphoteric surfactants that may suitable for use with the present invention includes the derivatives of secondary and tertiary amines having aliphatic radicals that are straight chain or branched, where one of the aliphatic substituents contains from about 8 to 18 carbon atoms and at least one of the aliphatic substituents contains an anionic water-solubilizing group, such as a carboxy, sulfonate, or sulfate group. Some examples of amphoteric surfactants include, but are not limited to, sodium 3-(dodecylamino)propionate, sodium 3-(dodecylamino)-propane-1-sulfonate, sodium 2-(dodecylamino)ethyl sulfate, sodium 2-(dimethylamino)octadecanoate, disodium 3-(N-carboxymethyl-dodecylamino)propane-1-sulfonate, sodium 1-carboxymethyl-2-undecylimidazole, disodium octadecyliminodiacetate, and sodium N,N-bis(2-hydroxyethyl)-2-sulfato-3-dodecoxypropylamine.

Additional classes of suitable amphoteric surfactants include phosphobetaines and phosphitaines. For instance, some examples of such amphoteric surfactants include, but are not limited to, sodium coconut N-methyl taurate, sodium oleyl N-methyl taurate, sodium tall oil acid N-methyl taurate, cocodimethylcarboxymethylbetaine, lauryldimethylcarboxymethylbetaine, lauryldimethylcarboxyethylbetaine, cetyldimethylcarboxymethylbetaine, sodium palmitoyl N-methyl taurate, oleyldimethylgammacarboxypropylbetaine, lauryl-bis-(2-hydroxypropyl)-carboxyethylbetaine, di-sodium oleamide PEG-2 sulfosuccinate, laurylamido-bis-(2-hydroxyethyl) propylsultaine, lauryl-bis-(2-hydroxyethyl) carboxymethylbetaine, cocoamidodimethylpropylsultaine, stearylamidodimethylpropylsultaine, TEA oleamido PEG-2 sulfosuccinate, disodium oleamide MEA sulfosuccinate, disodium oleamide MIPA sulfosuccinate, disodium ricinoleamide MEA sulfosuccinate, disodium undecylenamide MEA sulfosuccinate, disodium wheat germamido MEA sulfosuccinate, disodium wheat germamido PEG-2 sulfosuccinate, disodium isostearamideo MEA sulfosuccinate, cocoamido propyl monosodium phosphitaine, lauric myristic amido propyl monosodium phosphitaine, cocoamido disodium 3-hydroxypropyl phosphobetaine, lauric myristic amido disodium 3-hydroxypropyl phosphobetaine, lauric myristic amido glyceryl phosphobetaine, lauric myristic amido carboxy disodium 3-hydroxypropyl phosphobetaine, cocoamphoglycinate, cocoamphocarboxyglycinate, capryloamphocarboxyglycinate, lauroamphocarboxyglycinate, lauroamphoglycinate, capryloamphocarboxypropionate, lauroamphocarboxypropionate, cocoamphopropionate, cocoamphocarboxypropionate, dihydroxyethyl tallow glycinate, and mixtures thereof.

In certain instances, one or more anionic surfactants may be used. Suitable anionic surfactants include, but are not limited to, alkyl sulfates, alkyl ether sulfates, alkyl ether sulfonates, sulfate esters of an alkylphenoxy polyoxyethylene ethanol, alpha-olefin sulfonates, beta-alkoxy alkane sulfonates, alkylauryl sulfonates, alkyl monoglyceride sulfates, alkyl monoglyceride sulfonates, alkyl carbonates, alkyl ether carboxylates, fatty acids, sulfosuccinates, sarcosinates, octoxynol or nonoxynol phosphates, taurates, fatty taurides, fatty acid amide polyoxyethylene sulfates, isethionates, or mixtures thereof.

Particular examples of some suitable anionic surfactants include, but are not limited to, $C_8$–$C_{18}$ alkyl sulfates, $C_8$–$C_{18}$ fatty acid salts, $C_8$–$C_{18}$ alkyl ether sulfates having one or two moles of ethoxylation, $C_8$–$C_{18}$ alkamine oxides, $C_{8-C18}$ alkoyl sarcosinates, $C_8$–$C_{18}$ sulfoacetates, $C_8$–$C_{18}$ sulfosuccinates, $C_8$–$C_{18}$ alkyl diphenyl oxide disulfonates, $C_8$–$C_{18}$ alkyl carbonates, $C_8$–$C_{18}$ alpha-olefin sulfonates, methyl ester sulfonates, and blends thereof. The $C_8$–$C_{18}$ alkyl group may be straight chain (e.g., lauryl) or branched (e.g., 2-ethylhexyl). The cation of the anionic surfactant may be an alkali metal (e.g., sodium or potassium), ammonium, $C_1$–$C_4$ alkylammonium (e.g., mono-, di-, tri), or $C_1$–$C_3$ alkanolammonium (e.g., mono-, di-, tri).

Specific examples of such anionic surfactants include, but are not limited to, lauryl sulfates, octyl sulfates, 2-ethylhexyl sulfates, lauramine oxide, decyl sulfates, tridecyl sulfates, cocoates, lauroyl sarcosinates, lauryl sulfosuccinates, linear $C_{10}$ diphenyl oxide disulfonates, lauryl sulfosuccinates, lauryl ether sulfates (1 and 2 moles ethylene oxide), myristyl sulfates, oleates, stearates, tallates, ricinoleates, cetyl sulfates, and so forth.

To impart the treatment to the exterior surface of the glove, the gloves are placed into a tumbling apparatus, for example, a dryer. The treatment to be applied is impregnated into, or coated onto, a substrate prior to the treatment process. The treatment may be applied to the substrate at any suitable level and by any suitable coating method, for example, roll coating, printing, foam treating, brush treating, immersion, spraying, and so forth. The substrate may be flexible or rigid, depending on the needs of the application. Further, where the treatment process is to occur under heated conditions, the substrate may be selected to be resistant to degradation at the temperature to which it will be exposed. In one embodiment, the substrate may be a flexible nonwoven material impregnated or coated with a cationic surfactant.

As used herein, the term "nonwoven fabric" or "nonwoven web" or "nonwoven material" means a web having a structure of individual fibers or threads that are randomly interlaid, but not in an identifiable manner or pattern as in a knitted fabric. Nonwoven fabrics or webs have been formed from many processes, for example, meltblowing processes, spunbonding processes, and bonded carded web processes.

As used herein, the term "spunbond" or "spunbond fibers" or "spunbonded fibers" refers to small diameter fibers that are formed by extruding molten thermoplastic material as filaments from a plurality of fine, usually circular capillaries of a spinneret with the diameter of the extruded filaments then being rapidly reduced, for example, as in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al.

As used herein, the term "meltblown" or "meltblown fibers" means fibers formed by extruding a molten thermoplastic material through a plurality of fine, usually circular, die capillaries as molten threads or filaments into converging high velocity, usually hot, gas (e.g. air) streams that attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin et al.

The substrate may be formed from a single layer of material or a composite of multiple layers. In the case of multiple layers, the layers may generally be positioned in a juxtaposed or surface-to-surface relationship and all or a portion of the layers may be bound to adjacent layers. The multiple layers of a composite may be joined to form a multilayer laminate by various methods, including but not limited to adhesive bonding, thermal bonding, or ultrasonic bonding. One composite material suitable for use with the present invention is a spunbond/meltblown/spunbond (SMS) laminate. An SMS laminate may be made by sequentially depositing onto a moving forming belt first a spunbond fabric layer, then a meltblown fabric layer and last another spunbond layer and then bonding the laminate in a manner described below. Alternatively, the fabric layers may be made individually, collected in rolls, and combined in a separate bonding step. Multilayer laminates may have multiple meltblown layers or multiple spunbond layers in many different configurations and may include materials other than nonwovens. Examples of such other materials include wovens, films, foam/film laminates and combinations thereof, for example, a spunbond/film/spunbond (SFS) laminate. Examples of other composite materials suitable for use in the present invention include, but are not limited to, those described in U.S. Pat. No. 4,041,203 to Brock et al., U.S. Pat. No. 5,169,706 to Collier, et al., U.S. Pat. No. 5,145,727 to Potts et al., U.S. Pat. No. 5,178,931 to Perkins et al., U.S. Pat. No. 4,374,888 to Bornslaeger, and U.S. Pat. No. 5,188,885 to Timmons et al., which are all incorporated herein by reference.

The treated substrate and the gloves are then tumbled in the tumbling apparatus. The treated substrate and the gloves are contacted until sufficient transfer from the substrate to the gloves has occurred to impart the desired attributes to the exterior surface. For some applications the gloves may be tumbled with the treated substrate for about 5 to about 80 minutes. In other applications, the gloves may be tumbled with the treated substrate for about 10 to about 60 minutes. In yet other applications, the gloves may be tumbled with the treated substrate for about 20 to about 40 minutes.

For some applications, it may be desirable to heat the apparatus during the tumbling process. Since many treatments have a reduced viscosity at lower temperatures, this may improve transfer of the treatment from the substrate to the gloves. For some applications, the temperature may be maintained during treatment at about 20° C. to about 80° C. For other applications, the temperature may be maintained during treatment at about 30° C. to about 60° C. In yet other applications, the temperature may be maintained at about 40° C. to about 50° C.

The treatment may be applied to the gloves at any level suitable for a given application. In some embodiments, the treatment is applied to the glove so that the treatment is applied at a level of from about 0.01 mass % to about 2.0 mass % of the glove. In other embodiments, the treatment may be applied at a level of from about 0.1 mass % to about 1.0 mass % of the glove. In yet other embodiments, the treatment may be applied at a level of from about 0.25 mass % to about 0.75 mass % of the glove.

When the treatment process is complete, the gloves are removed from the tumbling apparatus. It is contemplated that one or more treatments may be applied to the exterior surface using substantially the same method as described above, or in combination with any other suitable means. If no further treatment is desired, the gloves are prepared for any additional processes, such as cleaning, stacking, and packaging.

The present invention further includes application of the same or a different treatment to the inside surface of the glove in a similar manner. To do so, after the outside layer has been treated to obtain the selected attributes, the glove is inverted to expose the inside surface. At this time, the exterior surface of the glove is concealed. For instance, for some applications, a lubricant may be applied to the inside surface to improve donning of the glove. The lubricant may include, for example, a cationic surfactant (e.g., cetyl pyridinium chloride), an anionic surfactant (e.g., sodium lauryl sulfate), a nonionic surfactant, or an amphoteric surfactant, such as those described above.

In one embodiment, the lubricant may include a silicone or silicone-based component. As used herein, the term "silicone" generally refers to a broad family of synthetic polymers that have a repeating silicon-oxygen backbone, including, but not limited to, polydimethylsiloxane and polysiloxanes having hydrogen-bonding functional groups selected from the group consisting of amino, carboxyl, hydroxyl, ether, polyether, aldehyde, ketone, amide, ester, and thiol groups. In some embodiments, polydimethylsiloxane and/or modified polysiloxanes may be used as the silicone component in accordance with the present invention. Some suitable modified polysiloxanes that may be used in the present invention include, but are not limited to, phenyl-modified polysiloxanes, vinyl-modified polysiloxanes, methyl-modified polysiloxanes, fluoro-modified polysiloxanes, alkyl-modified polysiloxanes, alkoxy-modified polysiloxanes, amino-modified polysiloxanes, and combinations thereof.

Examples of some suitable phenyl-modified polysiloxanes include, but are not limited to, dimethyldiphenylpolysiloxane copolymers, dimethyl and methylphenylpolysiloxane copolymers, polymethylphenylsiloxane, and methylphenyl and dimethylsiloxane copolymers. Phenyl modified polysiloxanes that have a relatively low phenyl content (less than about 50 mole %) may be particularly effective in the present invention. For example, the phenyl-modified polysiloxane may be a diphenyl-modified silicone, such as a diphenylsiloxane-modified dimethylpolysiloxane. In some embodiments, the phenyl-modified polysiloxane contains phenyl units in an amount from about 0.5 mole % to about 50 mole %. In other embodiments, the phenyl-modified polysiloxane contains phenyl units in an amount less than about 25 mole %. In yet other embodiments, the phenyl-modified polysiloxane contains phenyl units in an amount less than about 15 mole %. In one particular embodiment, a diphenylsiloxane-modified dimethylpolysiloxane may be used that contains diphenylsiloxane units in an amount less than about 5 mole %. In still another embodiment, a diphenylsiloxane-modified dimethylpolysiloxane may be used that contains diphenylsiloxane units in an amount less than about 2 mole %. The diphenylsiloxane-modified dimethylpolysiloxane may be synthesized by reacting diphenylsiloxane with dimethylsiloxane.

As indicated above, fluoro-modified polysiloxanes may also be used with the present invention. For instance, one suitable fluoro-modified polysiloxane that may be used is a trifluoropropyl modified polysiloxane, such as a trifluoropropylsiloxane modified dimethylpolysiloxane. A trifluoropropylsiloxane modified dimethylpolysiloxane may be synthesized by reacting methyl, 3,3,3 trifluoropropylsiloxane with dimethylsiloxane. The fluoro-modified silicones may contain from about 5 mole % to about 95 mole % of fluoro groups, such as trifluoropropylsiloxane units. In another embodiment, the fluoro-modified silicones may contain from about 40 mole % to about 60 mole % of fluoro groups. In yet another embodiment, a trifluoropropylsiloxane-modified dimethylpolysiloxane may be used that contains 50 mole % trifluoropropylsiloxane units.

Other modified polysiloxanes may be utilized with the present invention. For instance, some suitable vinyl-modified polysiloxanes include, but are not limited to, vinyldimethyl terminated polydimethylsiloxanes, vinylmethyl and dimethylpolysiloxane copolymers, vinyldimethyl terminated vinylmethyl and dimethylpolysiloxane copolymers, divinylmethyl terminated polydimethylsiloxanes, and vinylphenylmethyl terminated polydimethylsiloxanes. Further, some methyl-modified polysiloxanes that may be used include, but are not limited to, dimethylhydro terminated polydimethylsiloxanes, methylhydro and dimethylpolysiloxane copolymers, methylhydro terminated methyloctyl siloxane copolymers and methylhydro and phenylmethyl siloxane copolymers. In addition, some examples of amino-modified polysiloxanes include, but are not limited to, polymethyl (3-aminopropyl)-siloxane and polymethyl [3-(2-aminoethyl) aminopropyl]-siloxane.

The particular polysiloxanes described above are meant to include hetero- or co-polymers formed from polymerization or copolymerization of dimethylsiloxane cyclics and diphenylsiloxane cyclics or trifluoropropylsiloxane cyclics with appropriate endcapping units. Thus, for example, the terms "diphenyl modified dimethylpolysiloxanes" and "copoloymers of diphenylpolysiloxane and dimethylpolysiloxane" may be used interchangeably. Moreover, other examples of polysiloxanes that may be used with the present invention are described in U.S. Pat. No. 5,742,943 to Chen and U.S. Pat. No. 6,306,514 to Weikel, et al., which are incorporated herein in their entirety by reference thereto for all purposes.

One silicone that may be used with the present invention is provided as an emulsion under the trade name DC 365. DC 365 is a pre-emulsified silicone (35% total solids content ("TSC")) that is commercially available from Dow Corning Corporation (Midland, Mich.). DC 365 is believed to contain 40–70 mass % water (aqueous solvent), 30–60 mass % methyl-modified polydimethylsiloxane (silicone), 1–5 mass % propylene glycol (non-aqueous solvent), 1–5 mass % polyethylene glycol sorbitan monolaurate (nonionic surfactant), and 1–5 mass % octylphenoxy polyethoxy ethanol (nonionic surfactant). Another silicone emulsion that may be used with the present invention is SM 2140, commercially available from General Electric Silicones of Waterford, N.Y. ("GE Silicones"). SM 2140 is a pre-emulsified silicone (25% TSC) that is believed to contain 30–60 mass % water (aqueous solvent), 30–60 mass % amino-modified dimethylpolysiloxane (silicone), 1–5% ethoxylated nonyl phenol (nonionic surfactant), 1–5 mass % trimethyl-4-nonyloxypolyethyleneoxy ethanol (nonionic surfactant), and minor percentages of acetaldehyde, formaldehyde, and 1,4 dioxane. If desired, these pre-emulsified silicones may be diluted with water or other solvents prior to use.

In another embodiment, the treatment may contain a quaternary ammonium compound, such as that commercially available from Goldschmidt Chemical Corporation of Dublin, Ohio under the trade name Verisoft BTMS, and a silicone emulsion such as that commercially available from GE Silicones under the trade name AF-60. Verisoft BTMS contains behnyl trimethyl sulfate and cetyl alcohol, while AF-60 contains polydimethylsiloxane, acetylaldehyde, and small percentages of emulsifiers.

Alternatively, any other treatment may be applied to the interior surface to impart the desired attribute to the glove. Other such treatments include emollients that may provide skin health benefits, antimicrobials, and so forth.

It has been discovered that the treatment process of the present invention provides significant advantages over traditional treatment techniques. Traditional post-processes commonly involve the application of treatments to the glove using an immersion technique. During the immersion process, the treatment to be applied is added to a large amount of water, prior to immersing the gloves therein, and tumbling the gloves with the mixture for a fixed period of time. The gloves are then removed from the tumbling apparatus and are dried to remove excess water, leaving the treatment on the surface of the glove. This process is more costly and more cumbersome than the method of the present invention. Furthermore, the immersion technique is less able to be controlled because the water and treatment to be applied inevitably migrate into the interior of the glove during agitation, contacting the concealed surface that is not intended to be treated. The treatment method of the present invention is substantially water-free, and is therefore less costly and more efficacious.

The present invention may be better understood with reference to the following example.

EXAMPLE

The ability to treat an elastomeric article according the method of the present invention was demonstrated. One hundred nitrile gloves commercially available from Kimberly-Clark Worldwide, Inc. under the trade name SAFESKIN NEON POWDER FREE NITRILE EXAM GLOVES were removed from a dispenser. The gloves were quite tacky and many exhibited bricking as the gloves were removed. The gloves were separated from each other and placed into a Kenmore Heavy Duty home clothes dryer with two WalMart Brand dryer sheets, each containing "cationic and nonionic softeners" as indicated on the label (generally known to be surfactants). The clothes dryer was set at the maximum heat setting, estimated to be approximately about 60° C. to about 80° C. After tumbling the gloves in the dryer for about 5 minutes, the dryer setting was changed to "cool down" (no additional heat added) and the gloves were tumbled for about 5 minutes. The gloves were then stacked and placed into the dispenser as originally found. The gloves were dispensed one at a time. It was found that the gloves dispensed very easily and did not stick to themselves or each other. The gloves were then donned and compared to untreated gloves by picking up several objects commonly found in a home. The surface characteristics of the gloves had been modified to reduce bricking, but the gripping properties had not been adversely affected.

The invention may be embodied in other specific forms without departing from the scope and spirit of the inventive characteristics thereof. The present embodiments therefore are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method which is substantially water-free for treating a surface of an elastomeric article comprising:
   (a) providing a substrate including a treatment;
   (b) providing an elastomeric article having an exposed surface;
   (c) placing the article and the substrate into a tumbling apparatus; and
   (d) tumbling the article with the substrate such that the treatment is transferred from the substrate to the exposed surface.

2. The method of claim 1, further comprising heating the tumbling apparatus.

3. The method of claim 1, further comprising heating the tumbling apparatus to a temperature of from about 20° C. to about 80° C.

4. The method of claim 1, wherein the article is tumbled with the substrate for at least about 5 minutes.

5. The method of claim 1, wherein the substrate is flexible.

6. The method of claim 1, wherein the substrate is a nonwoven fabric.

7. The method of claim 1, wherein the exposed surface is an exterior surface of the article.

8. The method of claim 1, wherein the treatment is a surfactant.

9. The method of claim 8, wherein the treatment is a cationic surfactant.

10. The method of claim 9, wherein the surfactant is selected from the group consisting of behenetrimonium methosulfate, distearyldimonium chloride, and dimethyl dioctadecyl ammonium chloride.

11. The method of claim 1, wherein the treatment is transferred to the article at a level of from about 0.01 mass % to about 2.0 mass %.

12. The method of claim 1, wherein the treatment is transferred to the article at a level of from about 0.1 mass % to about 1.0 mass %.

13. A method which is substantially water-free for selectively applying a treatment to an elastomeric article comprising;
   (a) tumbling a first substrate impregnated with a first treatment with at least one elastomeric article having an interior surface and an exterior surface, wherein the exterior surface is exposed, such that the first treatment is transferred from the first substrate to the exterior surface:
   (b) inverting the article to expose the interior surface;
   (c) tumbling the article with a second substrate impregnated with a second treatment such that the second treatment is transferred from the substrate to the interior surface.

14. The method of claim 13, further comprising heating the tumbling apparatus.

15. The method of claim 13, wherein the first treatment is a cationic surfactant.

16. The method of claim 15, wherein the surfactant is selected from the group consisting of behenetrimonium methosulfate, distearyldimonium chloride, and dimethyl dioctadecyl ammonium chloride.

17. The method of claim 13, wherein the second treatment is a lubricant.

18. The method of claim 17, wherein the lubricant comprises a silicone.

19. The method of claim 13, wherein the first substrate is tumbled with the article in a first tumbling apparatus and the second substrate is tumbled with the article in a second tumbling apparatus.

20. An elastomeric glove having reduced tack formed by the substantially water-free method comprising:
   (a) providing a substrate having a treatment including a cationic surfactant;
   (b) providing a glove having an exposed exterior surface and an interior surface, wherein the exterior surface is anionic;
   (c) tumbling the glove with the substrate in a tumbling apparatus such that the treatment is transferred from the substrate to the exterior surface.

* * * * *